US006804631B2

(12) United States Patent
Kelley et al.

(10) Patent No.: US 6,804,631 B2
(45) Date of Patent: Oct. 12, 2004

(54) EVENT DATA ACQUISITION

(75) Inventors: David Kelley, Woodinville, WA (US); Larry Morris, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 10/147,113

(22) Filed: May 15, 2002

(65) Prior Publication Data

US 2003/0217189 A1 Nov. 20, 2003

(51) Int. Cl.⁷ .............................................. G06F 15/00
(52) U.S. Cl. ...................................... 702/187; 714/47
(58) Field of Search ..................... 714/47–48, 701–702, 714/718–723; 702/108, 117–118, 123–124, 179–180, 182–183, 186–189

(56) References Cited

U.S. PATENT DOCUMENTS

| | | | | |
|---|---|---|---|---|
| 5,377,344 A | * | 12/1994 | Stager et al. ................ | 711/154 |
| 5,877,812 A | * | 3/1999 | Krause et al. ......... | 375/240.25 |
| 5,905,870 A | * | 5/1999 | Mangin et al. .............. | 709/234 |
| 5,970,439 A | * | 10/1999 | Levine et al. ................ | 702/186 |
| 5,991,708 A | * | 11/1999 | Levine et al. ................ | 702/186 |
| 6,175,814 B1 | * | 1/2001 | Chrysos et al. .............. | 702/182 |
| 6,332,117 B1 | * | 12/2001 | Berry et al. ................. | 702/187 |
| 6,502,205 B1 | * | 12/2002 | Yanai et al. .................... | 714/7 |
| 6,529,954 B1 | * | 3/2003 | Cookmeyer et al. ......... | 709/224 |
| 6,567,770 B2 | * | 5/2003 | Dorough ...................... | 702/188 |
| 6,598,003 B1 | * | 7/2003 | Heino et al. .................. | 702/68 |
| 6,633,835 B1 | * | 10/2003 | Moran et al. ................ | 702/190 |

OTHER PUBLICATIONS

Randy E. Phillips & Mark J. Thullen, "Embedded Computer System Integration Support," TRW Electronic Systems Group, Military Electronics and Avionics Division, Beavercreek, Ohio, Dayton Engineering Laboratory, 1989 IEEE, pp. 616–622.

Mohammed El Shobaki & Lennart Lindh, Malardalen Real–Time Research Centre, Dept. of Computer Engineering, Malardalen University, Vasteras, Sweden, "A Hardware and Software Monitor for High–Level System–on–Chip Verification," 2001 IEEE, pp. 56–61.

* cited by examiner

*Primary Examiner*—Marc S. Hoff
*Assistant Examiner*—Mary Catherine Baran
(74) *Attorney, Agent, or Firm*—Lee & Hayes, PLLC (57) ABSTRACT

An event data acquisition device has a data segment multiplexer to receive data segments corresponding to processor events generated with a test device, and a memory component to maintain the data segments in an order that they are received from the test device. A control component of the event data acquisition device pauses the test device processor when the memory component exceeds a threshold number of stored data segments. An event data packet component generates event data packets where an individual data packet includes data segments having information for a particular processor event.

56 Claims, 8 Drawing Sheets

EVENT DATA ACQUISITION

TECHNICAL FIELD

This invention relates to event data acquisition and, in particular, to systems and methods for logging event data corresponding to processor events in a test device, and maintaining the event data to evaluate the performance of the test device processor.

BACKGROUND

Software event log tools are used to log microprocessor events on a target system, or test device, for embedded software development and for developing new operating systems. When executing an operating system on a test device, event logging software records processor events such as thread switching, process switching, user directed events, interrupts, mutex and critical section manipulation, memory allocation, and the like to measure processor performance. An event log tool recognizes the processor events and stores associated event data in memory buffers on the test device. Conventionally, the test device temporarily maintains the event data in multiple circular memory buffers, and periodically sends the stored event data to a host computing device that is connected to the test device.

Inherently, a software event log tool affects the performance of a test device processor when measuring the performance of the processor because the event log tool is intrusive. That is to say, a software event log tool affects processor performance by using processor time and one or more processor threads to manage the memory buffers, write the event data to the memory buffers, maintain the event data, and to read and communicate the event data over a transport to a host computing device for performance evaluation.

Another example of software event log intrusion occurs when a user mode processing event is preempted with a system interrupt. A typical solution to prevent a system interrupt when evaluating and/or logging a particular user mode event is to disable the system interrupt. However, this can cause interrupt latencies and unreliable performance characteristics of the test device processor.

Accordingly, there is a need to minimize the intrusion of a test device processor when logging test system events, and a need to generate reliable performance data when logging the events.

SUMMARY

An event data acquisition device has a data segment multiplexer to receive data segments corresponding to processor events generated with a test device, and a memory component to maintain the data segments in an order that they are received from the test device. A control component of the event data acquisition device pauses the test device processor when the memory component exceeds a threshold number of stored data segments. The control component also resumes processing of the test device when the memory component maintains less than the threshold number of stored data segments.

In one implementation, the data segment multiplexer timestamps the data segments when they are received from the test device and labels the data segments to identify which have header information and which have event information. The data segments having header information are labeled with a memory address identifier corresponding to a first memory address of the test device, and the data segments having event information are labeled with a memory address identifier corresponding to a second memory address of the test device. An event data packet component generates event data packets where an individual data packet includes data segment(s) having information for a particular processor event.

BRIEF DESCRIPTION OF THE DRAWINGS

The same numbers are used throughout the drawings to reference like features and components.

DETAILED DESCRIPTION

The following describes systems and methods for event data acquisition. An event data acquisition device multiplexes processor event data segments received from a test device, manages memory components to process and control the flow of processor event data streams, and generates event data packets that are communicated to a host computing device. The host computing device has event data process tools to evaluate the performance of the test device processor.

Exemplary Event Data Acquisition System

Figure 1:
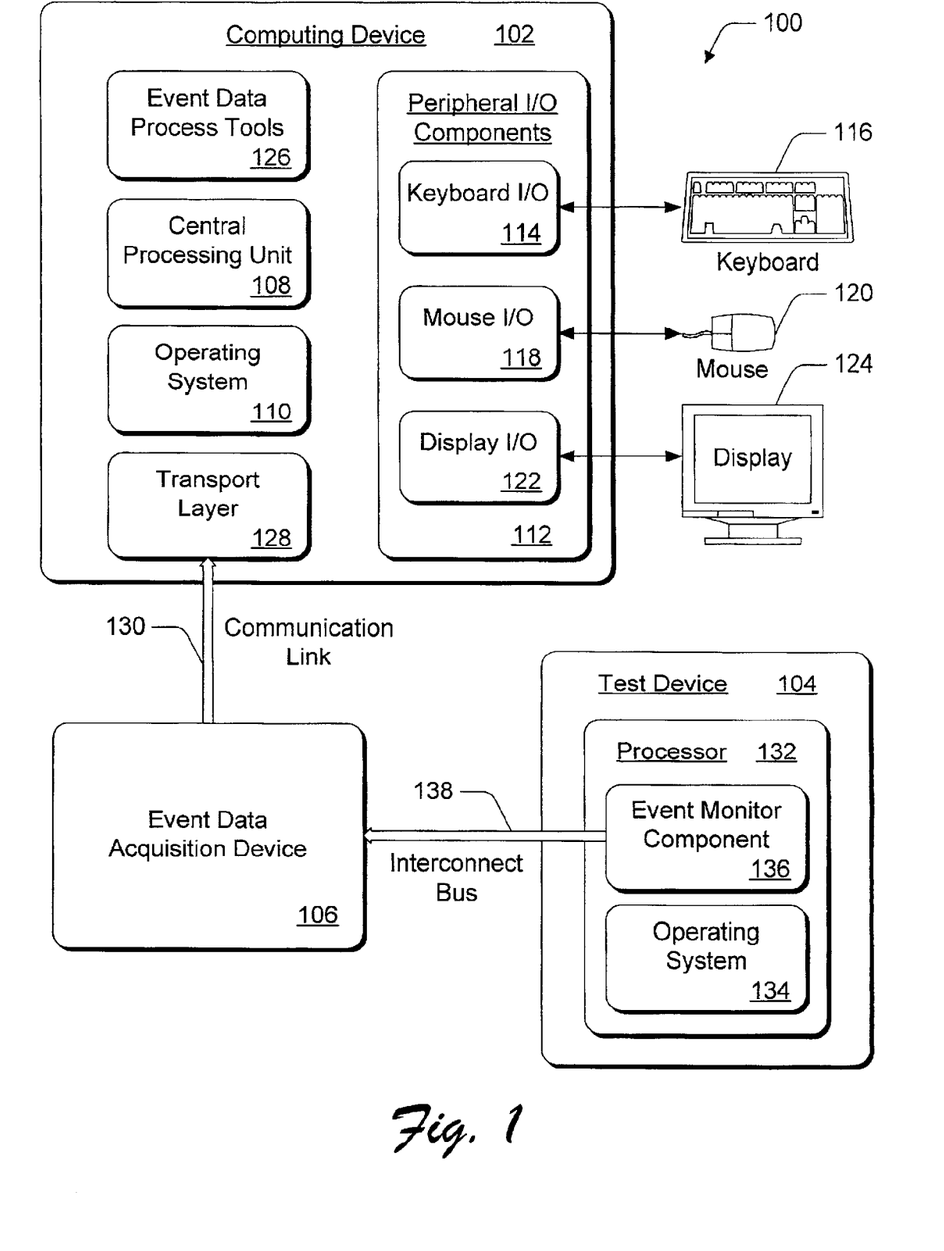
FIG. 1 is a block diagram of an exemplary event data acquisition system.

FIG. 1 illustrates an exemplary event data acquisition system 100 having components that can be implemented within a computing system having more than one computing device. The event data acquisition system 100 includes a computing device 102, a test device 104, and an event data acquisition device 106. See the description of "Exemplary Computing System and Environment" below for specific examples and implementations of networks, computing systems, computing devices, and components that can be used to implement the event data acquisition system and components described herein, such as computing device 102, test device 104, and event data acquisition device 106.

Computing device 102 includes a central processing unit 108, an operating system 110, and a system of peripheral input/output components 112, such as device drivers and connectors, to couple and support external input/output devices for computing device 102. The peripheral input/output components 112 include a keyboard input/output 114 for an external keyboard 116, a mouse input/output 118 for an external mouse 120, and a display input/output 122 for an external display device 124. Although not shown, the system of peripheral input/output components 112 can also include wireless interface components for communication with infrared, Bluetooth, and similar wireless input/output devices.

Computing device 102 also includes event data process tools 126 and a transport layer 128 that is a connection interface for a communication link 130 between computing device 102 and event data acquisition device 106. Communication link 130 can be implemented as a USB (universal serial bus), or Ethernet connection, for example.

Test device 104 is a computing device that includes a processor 132 which executes an operating system 134 and an event monitor component 136. Additionally, test device 104 can include a read only memory (ROM), a random access memory (RAM), and/or other components implemented to evaluate the performance of processor 132 when executing operating system 134.

When a developer configures and builds a new operating system to be tested, an image of the new operating system is downloaded to test device 104. An operating system image is a self contained binary file that contains embedded operating system 134 and associated components, such as device drivers. When an operating system image is downloaded and stored on test device 104, the corresponding operating system 134 is executed on processor 132.

Event monitor component 136 can be implemented as a software component, such as an application program interface (API) to write processor 132 events to a selected range of memory addresses on an interconnect bus 138 of the event data acquisition device 106. Processor events include thread switching, process switching, user directed events, interrupts, mutex and critical section manipulation, memory allocation, and the like. When processor 132 generates an event and writes information associated with the event to one of the selected memory addresses, the event monitor component 136 acquires the information associated with the event.

The interconnect bus 138 connects the event data acquisition device 106 to processor 132 of test device 104. Interconnect bus 138 can be implemented as one or more of any of several types of bus structures, including a system bus, a memory bus or memory controller, a peripheral component interconnect (PCI) bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, and a Video Electronics Standards Association (VESA) local bus. The data acquisition device can monitor any bus in the event data acquisition system 100.

The event data acquisition device 106 appears as a range of memory locations to test device 104 and receives the processor event information as a data stream of thirty-two (32) bit word data segments. The event monitor component 136 writes the event data segments to one or more fixed physical memory addresses that correspond to the event data acquisition device 106 via interconnect bus 138. This is much faster and less intrusive than the conventional software solution of writing the event data to multiple circular memory buffers to temporarily store the event data, and then periodically transferring the event data from the memory buffers to a host computing device across a network connection.

Those skilled in the art will recognize that event data acquisition device 106 can be implemented as an independent component of event data acquisition system 100, as an expansion card that is coupled with test device 104 via interconnect bus 138, or with computing device 102 via a similar interconnect bus. Additionally, a connective interface (not shown) to couple the event data acquisition device 106 to test device 104 can be implemented with a field programmable gate array (FPGA) that is programmable and configurable for data acquisition from any number of different test devices.

Event data acquisition device 106 periodically communicates the processor event information received from test device 104 to computing device 102 via communication link 130. The event data process tools 126 at computing device 102 are utilized to evaluate the processor event information and a developer can view performance information for processor 132 on display device 124 which is connected to, or integrated with, computer system 102.

Exemplary Event Data Acquisition Device

Figure 2:
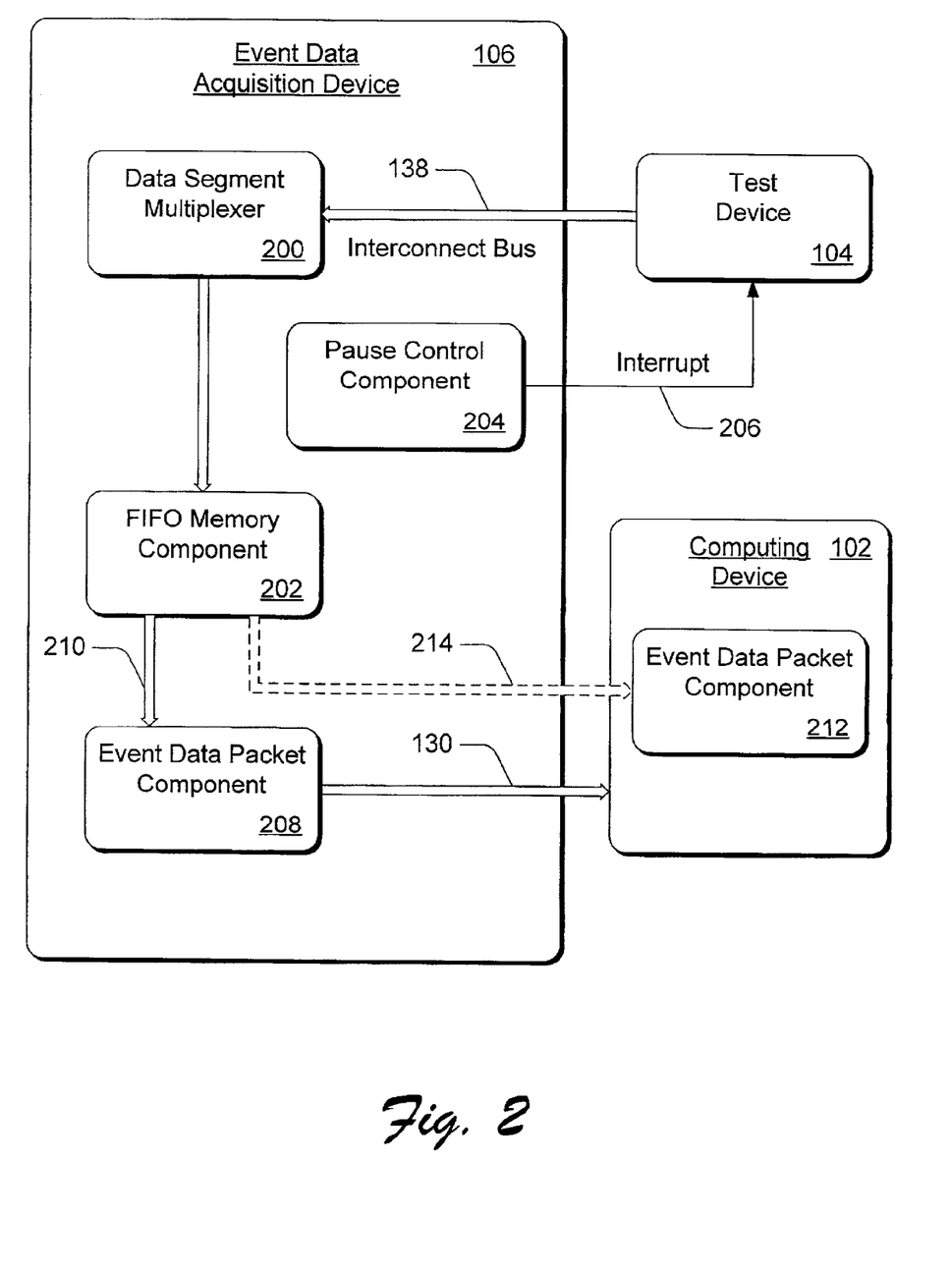
FIG. 2 is a block diagram that illustrates components of an exemplary event data acquisition device.

FIG. 2 illustrates components of the event data acquisition device 106 (FIG. 1) which manages processor event data segments and memory components to reduce and/or eliminate the intrusive effects of logging processor events from test device 104. Event data acquisition device 106 includes a data segment multiplexer 200, a first-in, first-out memory component 202, and a pause control component 204. Data segment multiplexer 200 receives an event data stream of data segments from test device 104 via interconnect bus 138. The data segments correspond to test device processor events.

Data segment multiplexer 200 time-stamps the data segments when they are received from test device 104 and identifies the data segments as having either header information or event information corresponding to a particular processor event. The identity of the information type is determined from the address that the data segments are written to. An address specifies both the data type (header information or event information) and the stream type (interrupt or non-interrupt), and can be incorporated with a data segment to be used as an identifier. The time-stamped data segments are then written to the first-in, first-out memory component 202 in the order that they are received from test device 104. Multiplexing the data segments received from test device 104 into the single first-in, first-out memory component 202 allows for interleaving interrupt and non-interrupt data without data loss or corruption of the event data segments. The first-in, first-out memory component 202 is a memory buffer that receives the data segments from the data segment multiplexer 200 and maintains, or otherwise stores, the data segments in the order that they are received from test device 104.

Pause control component 204 monitors the flow of data segments into and out of the first-in, first-out memory component 202 and controls the flow of event information from test device 104. Pause control component 204 has a general purpose output line that is a non-maskable interrupt 206 which can be implemented with a field programmable gate array (FPGA) to pause or stop processing in test device 104. The non-maskable interrupt 206 causes an interrupt service routine to execute and preempt any code executing on the test device processor 132 to preclude the event data acquisition device 106 from receiving more event information than it can process into and out of the first-in, first-out memory component 202. Pause control component 204 pauses processing in test device 104 when memory component 202 exceeds a threshold number of stored data segments. The interrupt service routine polls the non-maskable interrupt 206 waiting for it to be de-asserted which indicates that the memory component 202 is below the threshold of processor event information that can be processed.

When test device 104 is paused, a virtual time window allows the first-in, first-out memory component 202 to write out stored event data segments while avoiding the loss of any test information if the bandwidth of the event data acquisition device 106 cannot process the data segments at the rate that test device 104 generates the event information. Pause control component 204 also controls resuming the processing of test device 104 when memory component 202 maintains less than the threshold number of stored data segments.

The event data acquisition device 106 also includes an event data packet component 208 that receives the data segments written out from the first-in, first-out memory component 202 via data communication connection 210 and generates event data packets. An event data packet includes data segments having information corresponding to a particular test device event. For example, an individual event data packet includes at least one data segment having header information for a particular processor event and at least one data segment having event information for the particular processor event.

Event data packet component 208 also determines event data packet errors, such as with cyclic redundancy code (CRC) appended to an event data packet, so that lost or corrupted data can be accounted for to provide a more accurate performance evaluation of test device 104. Event data packets are communicated from event data packet component 208 to computing device 102 via communication link 130.

As an alternative to implementing event data packet component 208 within the event data acquisition device 106, an event data packet component 212 can be implemented as a component of computing device 102. The event data packet component 212 receives the data segments written out from the first-in, first-out memory component 202 via data communication connection 214, generates event data packets, and determines event data packet errors. Those skilled in the art will recognize that after the first-in, first-out memory component 202 writes out the data segments, it is an implementation choice as to where the event data packet component and any other processing components are located.

Figure 3:
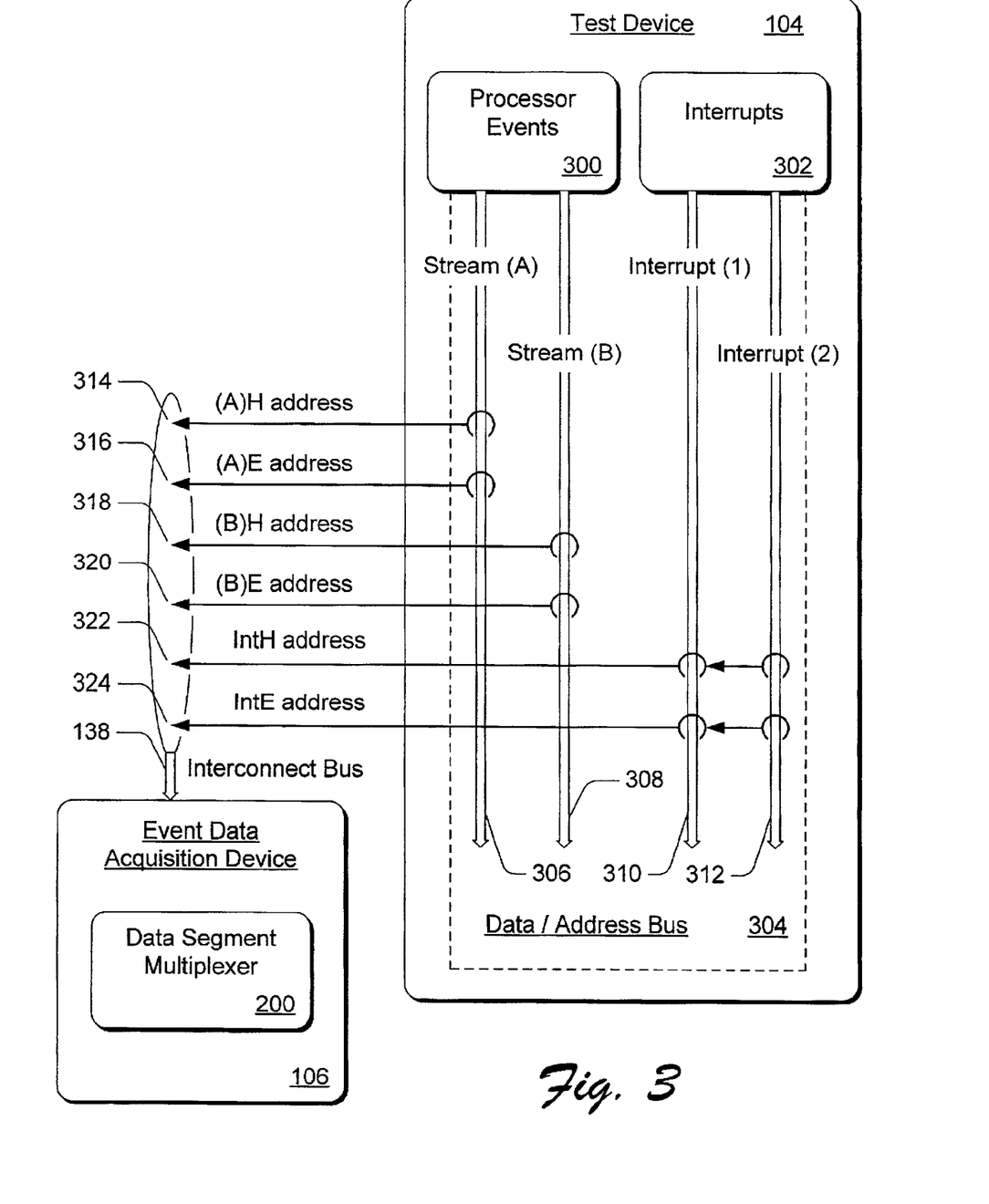
FIG. 3 is a block diagram that further illustrates components of the event data acquisition system shown in FIG. 1.

FIG. 3 shows components of the event data acquisition system 100 shown in FIG. 1, and illustrates how the event data acquisition device 106 receives data segments generated by processor events 300 and system interrupts 302 in test device 104. Event data acquisition device 106 is implemented, or otherwise configured, to monitor address designations of data and/or address buses 304 in test device 104.

In this example, processor events 300 generate two thread streams identified as stream (A) 306 and stream (B) 308. A thread serves a particular service request in test device 104, such as reading a file or writing to an external device, for example, to enable continued processor function when the input/output operation is completed. System interrupts 302 generate two thread stream interrupts identified as interrupt 310 (Int(1)) and interrupt 312 (Int(2)). The thread streams 306 (A) and 308 (B), and the interrupts 310 (Int(1)) and 312 (Int(2)), are commonly written to memory addresses that are monitored by the event data acquisition device 106.

Thread streams (A) 306 and (B) 308, and interrupts 310 and 312, include event data segments that have header information and event information for the event data packets. Test device 104 writes the data segments having header information to a first designated address, and writes the data segments having event information to a second designated address. For example, test device 104 writes thread stream (A) 306 data segments having header information to an (A)H address 314 and data segments having event information to an (A)E address 316. Similarly, thread stream (B) 308 data segments having header information are written to a (B)H address 318 and data segments having event information are written to a (B)E address 320. The memory addresses are designated and compiled into the operating system 134 when the developer configures and builds the new operating system to be tested.

Test device 104 writes Int(1) 310 and Int(2) 312 data segments having header information to an Int(1) address 322, and data segments having event information for the interrupts to an Int(2) address 324. The data segments having header information for both interrupts Int(1) 310 and Int(2) 312 can be written to the same memory address 322, and the data segments having event information for both interrupts can be written to the same memory address 324, because interrupt service routines complete in a nested order before returning to an interrupted thread (e.g., thread stream (B) 308). The data packets for interrupts Int(1) 310 and Int(2) 312 can be generated with the event data acquisition device 106 in the reverse of their nested order based on their interrupt priority.

Figure 4:
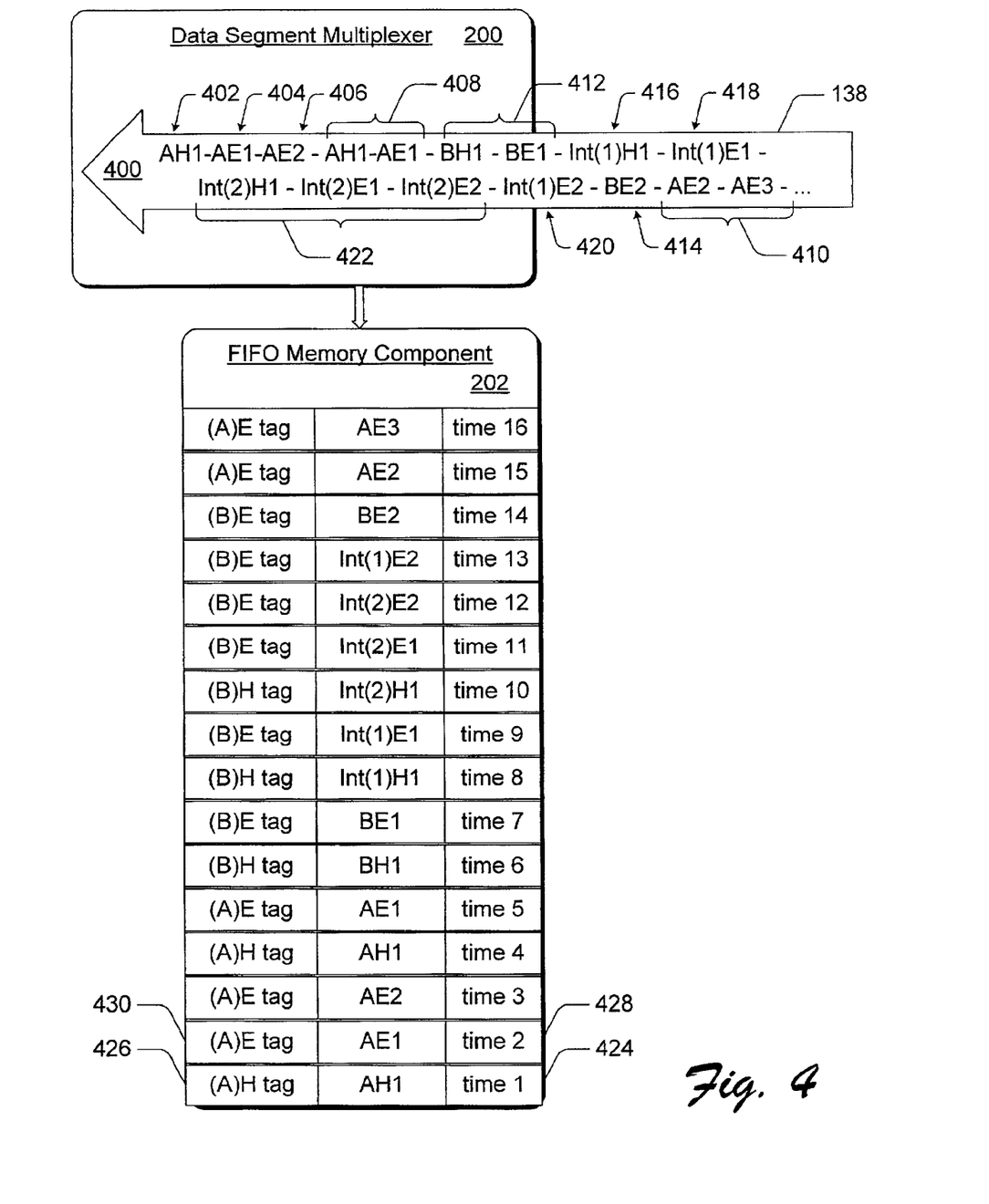
FIG. 4 is a block diagram that further illustrates components of the event data acquisition device shown in FIG. 2.

FIG. 4 illustrates components of the event data acquisition device 106 shown in FIG. 2, and illustrates an example of event data acquisition. In FIG. 4, data segment multiplexer 200 receives an event data stream 400 of data segments, such as data segment 402, from test device 104 via the interconnect bus 138. Each data segment is represented by text characters and one or more identifying numbers, such as AH1. The first character, "A" or "B", identifies a particular processor event thread stream, such as thread stream (A) 306 or thread stream (B) 308 shown in FIG. 3. The second character, "H" or "E", identifies either a data segment having header information or a data segment having event information. The number following the text characters represents the position one (1) to N of a particular data segment in an event data packet for a processor event.

Data segments 402, 404, and 406 represent a first processor event corresponding to thread stream (A) 306 that includes one header information data segment, AH1, and two event information data segments, AE1 and AE2. The first processor event represented by data segments 402, 404, and 406 is followed by a second processor event also corresponding to thread stream (A) 306. The second processor event is identified by data segments 408 and 410 which include one header information data segment, AH1, and three event information data segments AE1, AE2, and AE3.

The second processor event identified by data segments 408 and 410 is interrupted via a thread switch by a third processor event corresponding to thread stream (B) 308. The third processor event includes one header information data segment, BH1, and two event information data segments, BE1 and BE2, which are collectively identified as data segments 412 and 414. Thread stream (B) 308 (e.g., data segments BH1-BE1-BE2) is interrupted by system Int(1) 310 which is itself interrupted by a nested system Int(2) 312.

The third processor event corresponding to thread stream (B) 308, and identified as data segments 412 and 414, is interrupted between data segments BE1 and BE2 by the first system interrupt 310 which is identified as data segments 416, 418, and 420. The first interrupt includes one interrupt header information data segment, Int(1)H1, and two interrupt event information data segments, Int(1)E1 and Int(1)E2.

The first interrupt 310 is itself interrupted by the second system interrupt 312 which includes one interrupt header information data segment, Int(2)H1, and two interrupt event information data segments, Int(2)E1 and Int(2)E2, which are collectively identified as data segments 422. All of the interrupting data segments 422 for system interrupt 312 are nested between interrupt data segments Int(1)E1 and Int(1)E2. When a thread stream is preempted by an interrupt, or nested interrupts, any remaining event data for an interrupted processor event will immediately follow the interrupt data. For example, data segment BE2 which is data segment 414 immediately follows system interrupt data segment 420. This nesting structure can continue for any number of system interrupts, and header information and event information data segments for the current level of nested interrupts will be contiguous unless it is interrupted by a higher priority interrupt.

The data segment multiplexer 200 timestamps the individual data segments of event data stream 400 when they are received from test device 104. The data segment multiplexer 200 also labels the data segments with its corresponding memory address to identify the stream source. The data segments are then written to the first-in, first-out memory component 202 and maintained in the order that they are received from test device 104.

For example, data segment 402 (the first "AH1") is stored in the first-in, first-out memory component 202 where it will be the first data segment read out to the event data packet component 208 and/or computing device 102. The first received data segment 402 is maintained in the first-in, first-out memory component 202 with a timestamp "time1" 424 and is labeled with an (A)H tag 426 that identifies data segment 402 as corresponding to thread stream (A) 306 and having header information.

Similarly, the second received data segment 404 (AE1) is maintained in memory component 202 with a timestamp "time2" 428 and is labeled with an (A)E tag 430 that identifies data segment 404 as having event information. Each subsequent data segment (i.e., data segments identified as 406 through 422) is time-stamped, labeled with an identifier tag, and maintained in the first-in, first-out memory component 202 in the order that they are received from test device 104. It should be appreciated that an identifier tag can include only a portion of a memory address corresponding to a data segment to associate the data segment with the corresponding memory address of test device 104. The number of bits stored to identify a memory address can be determined by the number of individual memory addresses that are monitored by the event data acquisition device 106.

Figure 5:
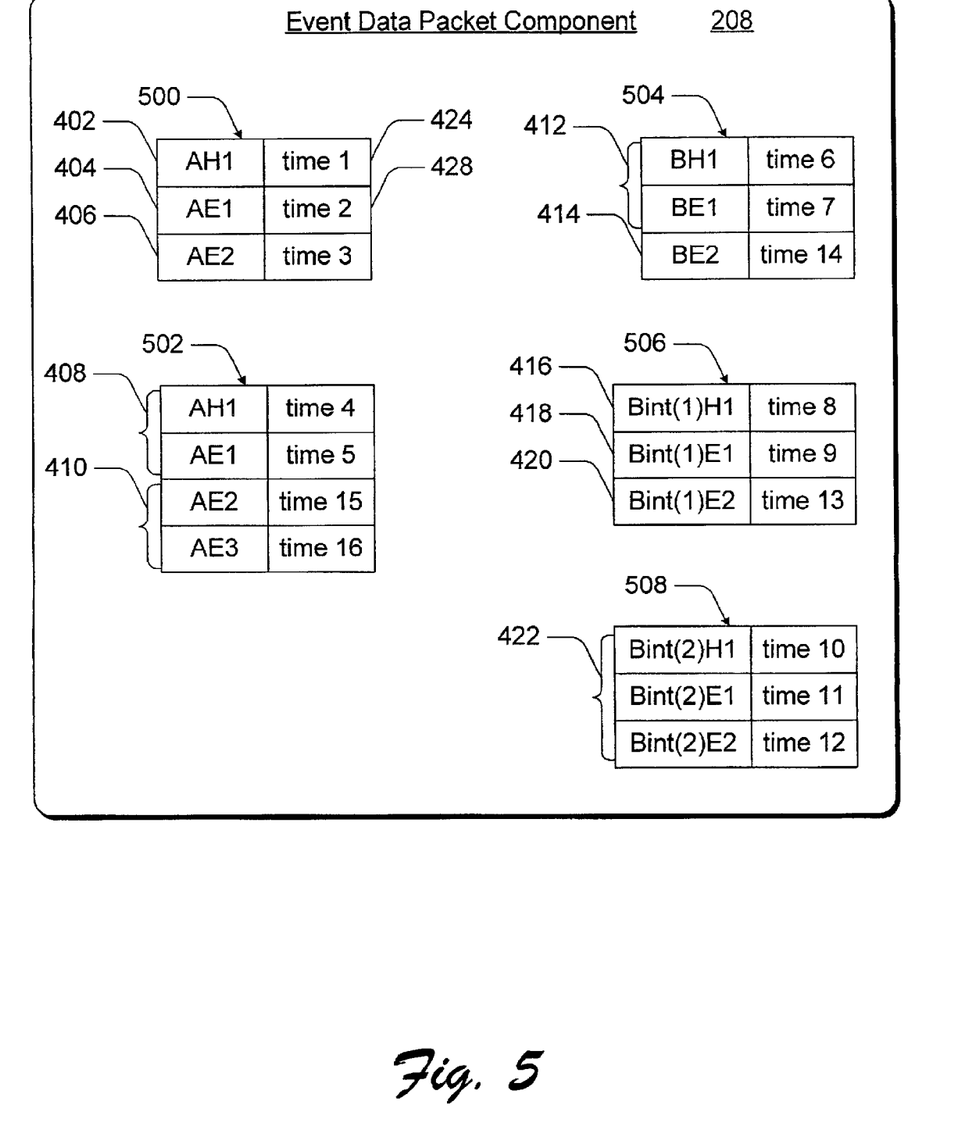
FIG. 5 is a block diagram that further illustrates components of the event data acquisition device shown in FIG. 2.

FIG. 5 further illustrates the event data packet component 208 which reads the data segments from the first-in, first-out memory component 202 and generates, or otherwise re-packetizes, event data packets by correlating the data segments. The identifier tags, such as the (A)H tag 426 and the (A)E tag 430, the associated data segment timestamps, such as timestamps 424 and 428, the thread stream indicators (A) and (B), and the data packet segment position indicators uniquely identify a data segment to the event data packet component 208 so that multiple nested thread stream sources and interrupt service routines can be distinguished and coordinated. This discussion applies equally to the alternate event data packet component 212 implemented within computing device 102 (FIG. 2).

An event data packet 500 is generated from data segments 402, 404, and 406 which represent the first processor event corresponding to thread stream (A) 306 beginning at "time1" 424 with header information data segment AH1. Another event data packet 502 is generated from data segments 408 and 410 which represent the second processor event also corresponding to thread stream (A) 306.

Similarly, event data packets 504, 506, and 508 are generated from the data segments that represent the processor events corresponding to thread stream (B) 308, the first interrupt 310, and the second interrupt 312, respectively. The processor event corresponding to thread stream (B) 308 includes the data segments 412 and 414 which are packetized in event data packet 504. Data packet 506 includes data segments 416, 418, and 420 corresponding to the first interrupt which are Int(1)H1, Int(1)E1, and Int(1)E2. Data packet 508 includes data segments 422 corresponding to the second interrupt which are Int(2)H1, Int(2)E1, and Int(2)E2.

Figure 6:
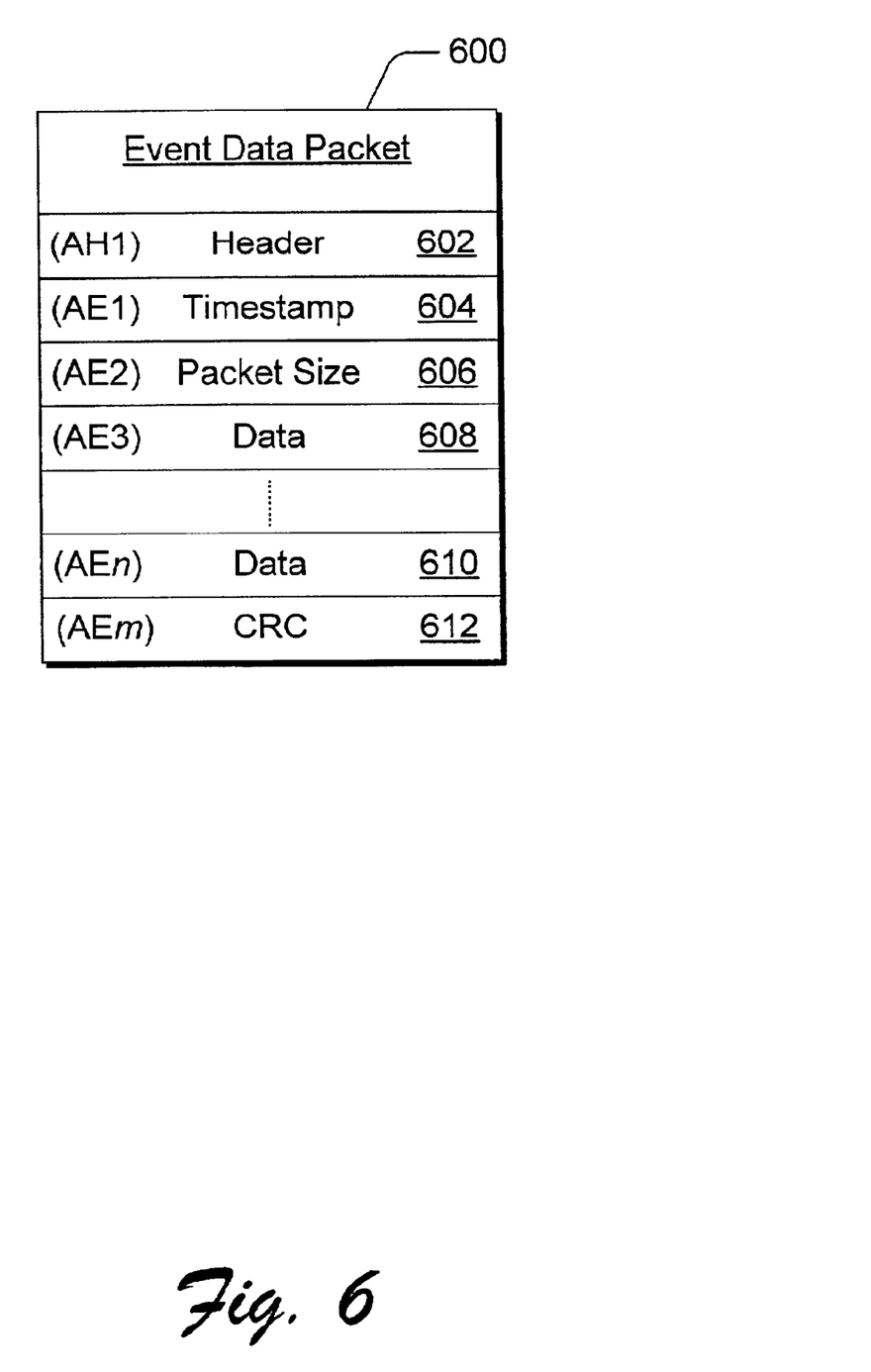
FIG. 6 illustrates an event data packet generated with components of the event data acquisition system shown in FIG. 1.

FIG. 6 illustrates an event data packet 600 that is an example of event data packets 502 through 508 generated with the event data packet component 208 (FIG. 5). Event data packet 600 includes header information 602 (such as from header information data segment 402 which includes header information AH1), an optional timestamp 604 for the event data packet 600 (such as from event information data segment 404 which includes event information AE1), a length variable 606 for the event data packet 600 (such as from event information data segment 406 which includes event information AE2), and additional data 608 through 610 from any number of additional data segments having event information AE3 through AEn. Event data packet 600 also includes CRC data 612 appended to the data packet 600 to determine data errors.

Methods for Event Data Acquisition

Figure 7:
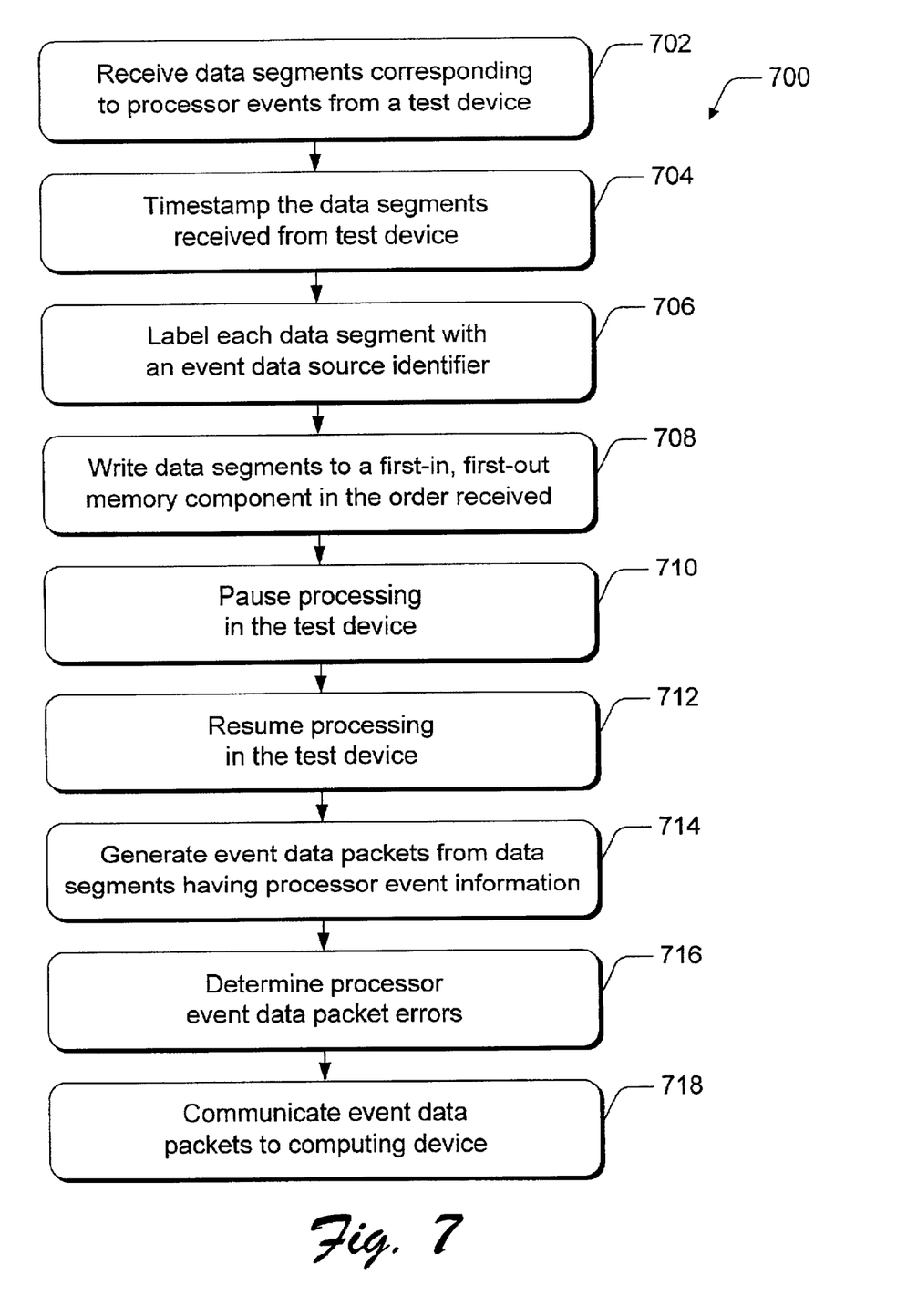
FIG. 7 is a flow diagram of a method for event data acquisition.

FIG. 7 illustrates a method 700 for event data acquisition. The order in which the method is described is not intended to be construed as a limitation, and any number of the described method blocks can be combined in any order to implement the method. Furthermore, the method can be implemented in any suitable hardware, software, firmware, or combination thereof.

At block 702, data segments corresponding to processor events are received from a test device. For example, event data acquisition device 106 receives data segments from test device 104 via interconnect bus 138 (FIG. 2). At block 704, the data segments received from the test device are timestamped. For example, data segment multiplexer 200 adds a timestamp to each data segment, such as timestamp "time1" 424 corresponding to data segment 402 and timestamp "time2" 428 corresponding to data segment 404 (FIG. 4).

At block 706, the data segments received from the test device are each labeled, or otherwise identified, with an event data source identifier corresponding to the source of each data segment. For example, data segment AH1 402 is identified as corresponding to thread stream (A) 306, and data segment BE2 414 is identified as corresponding to thread stream (B) 308. Further, data segments AH1 402 and BE2 414 are identified with a memory address identifier corresponding to a memory address of the test device. A memory address corresponding to a data segment identifies the data segment as having either header information (H) or event information (E) for an event data packet.

At block 708, the data segments are written to a first-in, first-out memory component in an order that they are received from the test device. For example, the data segments received from test device 104 are time-stamped and labeled with an event data source identifier and with a memory address identifier in data segment multiplexer 200. The data segments are then written to the first-in, first-out memory component 202 of the event data acquisition device 106. At block 710, processing in the test device is paused when the first-in, first-out memory component exceeds a threshold number of stored data segments. At block 712, processing in the test device is resumed when the first-in, first-out memory component maintains less than the threshold number of stored data segments.

At block 714, event data packets are generated, where an individual event data packet includes data segments having information corresponding to a particular processor event. For example, event data packet component 208 generates an event data packet that includes at least one data segment having header information for a particular processor event and at least one data segment having event information for the particular processor event.

At block 716, processor event data packet errors are determined. For example, the event data packet component 208 determines if packet data has been corrupted or lost. At block 718, the event data packets are communicated to a host computing device that evaluates the processor events. For example, the event data packets are communicated to computing device 102 which has event data process tools 126 that are utilized to evaluate the processor events generated by test device 104.

Exemplary Computing System and Environment

Figure 8:
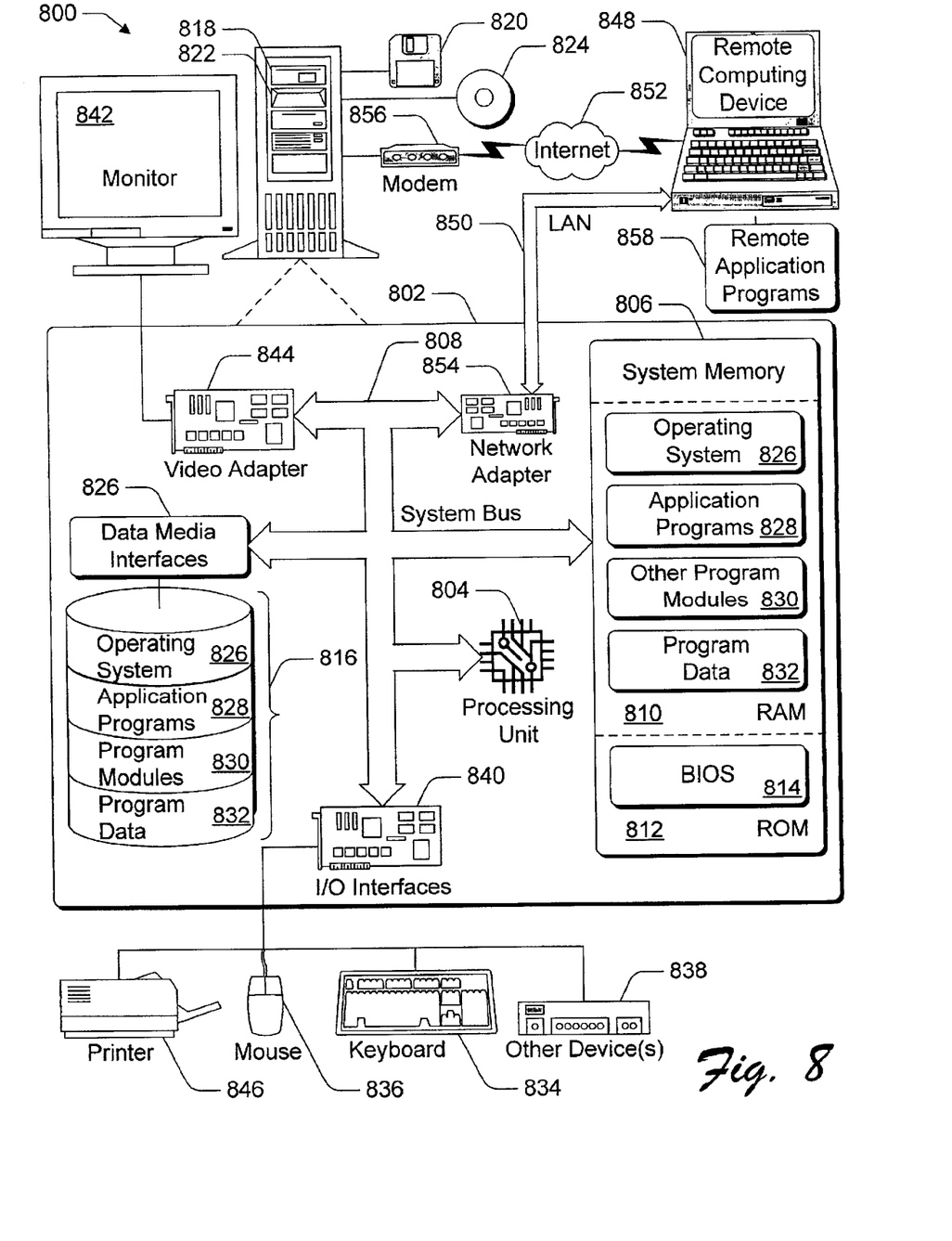
FIG. 8 is a diagram of computing systems, devices, and components in an environment that can be used to implement the systems and methods described herein.

FIG. 8 illustrates an example of a computing environment 800 within which the computer, network, and system architectures described herein can be either fully or partially implemented. Exemplary computing environment 800 is only one example of a computing system and is not intended to suggest any limitation as to the scope of use or functionality of the network architectures. Neither should the computing environment 800 be interpreted as having any dependency or requirement relating to any one or combination of components illustrated in the exemplary computing environment 800.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Event data acquisition may be described in the general context of computer-executable instructions, such as program modules, being executed by a computer. Generally, program modules include routines, programs, objects, components, data structures, etc. that perform particular tasks or implement particular abstract data types. Event data acquisition may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing system in the form of a computer 802. The components of computer 802 can include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by a SCSI interface (not shown).

The disk drives and their associated computer-readable media provide nonvolatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of event data acquisition.

Computer system 802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

Conclusion

The event data acquisition device illustrated in the figures and described herein is a minimally intrusive event data acquisition tool that provides a realistic model of processor performance and the overall system behavior of a test device by minimizing processor time that would otherwise be needed to generate and manage the event data information. The event data acquisition device manages processor event information and memory components to process and control event data streams, and generates event data packets that can be utilized to evaluate the system performance of the test device processor.

Although the systems and methods have been described in language specific to structural features and/or methods, it is to be understood that the invention defined in the appended claims is not necessarily limited to the specific features or methods described. Rather, the specific features and methods are disclosed as preferred forms of implementing the claimed invention.

What is claimed is:

1. A method to log processor events with an event data acquisition device, comprising:
   receiving data segments from a test device remotely connected to the event data acquisition device, the data segments corresponding to the processor events;
   writing the data segments to a first-in, first-out memory component in an order that they are received from the test device; and
   pausing processing in the test device with an interrupt output from the event data acquisition device when the first-in, first-out memory component exceeds a threshold number of stored data segments.

2. A method as recited in claim 1, further comprising resuming processing of the test device when the first-in, first-out memory component maintains less than the threshold number of stored data segments.

3. A method as recited in claim 1, further comprising resuming processing of the test device when the first-in, first-out memory component maintains less than a minimum number of stored data segments.

4. A method as recited in claim 1, further comprising time-stamping the data segments when they are received from the test device.

5. A method as recited in claim 1, further comprising:
   labeling a first data segment having header information with a memory address identifier corresponding to a first memory address of the test device; and
   labeling a second data segment having event information with a memory address identifier corresponding to a second memory address of the test device.

6. A method as recited in claim 1, further comprising:
   labeling a first data segment having header information with an event data source identifier corresponding to a source of the first data segment, and with a memory address identifier corresponding to a first memory address of the test device; and
   labeling a second data segment having event information with the event data source identifier corresponding to the source of the second data segment, and with a memory address identifier corresponding to a second memory address of the test device.

7. A method as recited in claim 1, further comprising:
   time-stamping the data segments when they are received from the test device;
   labeling a first data segment having header information with a memory address identifier corresponding to a first memory address of the test device; and labeling a second data segment having event information with a memory address identifier corresponding to a second memory address of the test device.

8. A method as recited in claim 1, further comprising:
time-stamping the data segments when they are received from the test device;
labeling a first data segment having header information with an event data source identifier corresponding to a source of the first data segment, and with a memory address identifier corresponding to a first memory address of the test device; and
labeling a second data segment having event information with the event data source identifier corresponding to the source of the second data segment, and with a memory address identifier corresponding to a second memory address of the test device.

9. A method as recited in claim 1, further comprising generating processor event data packets, an individual processor event data packet including at least one data segment having information for a particular processor event.

10. A method as recited in claim 1, further comprising:
time-stamping the data segments when they are received from the test device;
identifying the data segments having header information;
identifying the data segments having event information; and
generating a processor event data packet including at least one data segment having header information for a particular processor event and at least one data segment having event information for the particular processor event.

11. A method as recited in claim 1, further comprising:
generating processor event data packets, an individual processor event data packet including at least one data segment having information for a particular processor event; and
determining processor event data packet errors.

12. A method as recited in claim 1, further comprising:
generating processor event data packets, an individual processor event data packet including at least one data segment having information for a particular processor event;
determining processor event data packet errors; and
communicating the processor event data packets to a host computing device.

13. A method as recited in claim 1, wherein receiving the data segments includes receiving the data segments via an interconnect bus.

14. One or more computer-readable media comprising computer-executable instructions that, when executed, perform the method of claim 1.

15. A method, comprising:
receiving data segments from a remotely connected test device, the data segments corresponding to operating system test events generated in the remotely connected test device;
writing the data segments to a first-in, first-out memory component in an order that they are received from the remotely connected test device; and
generating event data packets, an individual event data packet including at least one data segment having information for a particular operating system test event.

16. A method as recited in claim 15, further comprising generating an event data packet including at least one data segment having header information for a particular operating system test event and at least one data segment having event information for the particular operating system test event.

17. A method as recited in claim 15, further comprising time-stamping the data segments when they are received from the remotely connected test device.

18. A method as recited in claim 15, further comprising:
labeling a first data segment having header information with a memory address identifier corresponding to a first memory address of the remotely connected test device; and
labeling a second data segment having operating system test event information with a memory address identifier corresponding to a second memory address of the remotely connected test device.

19. A method as recited in claim 15, further comprising:
labeling a first data segment having header information with an event data source identifier corresponding to a source of the first data segment, and with a memory address identifier corresponding to a first memory address of the remotely connected test device; and
labeling a second data segment having operating system test event information with the event data source identifier corresponding to the source of the second data segment, and with a memory address identifier corresponding to a second memory address of the remotely connected test device.

20. A method as recited in claim 15, further comprising:
time-stamping the data segments when they are received from the remotely connected test device;
labeling a first data segment having header information with a memory address identifier corresponding to a first memory address of the remotely connected test device; and
labeling a second data segment having operating system test event information with a memory address identifier corresponding to a second memory address of the remotely connected test device.

21. A method as recited in claim 15, further comprising:
time-stamping the data segments when they are received from the remotely connected test device;
labeling a first data segment having header information with an event data source identifier corresponding to a source of the first data segment, and with a memory address identifier corresponding to a first memory address of the remotely connected test device; and
labeling a second data segment having operating system test event information with the event data source identifier corresponding to the source of the second data segment, and with a memory address identifier corresponding to a second memory address of the remotely connected test device.

22. A method as recited in claim 15, further comprising pausing processing in the remotely connected test device when the first-in, first-out memory component exceeds a threshold number of stored data segments.

23. A method as recited in claim 15, further comprising pausing processing in the remotely connected test device when the first-in, first-out memory component exceeds a threshold number of stored data segments; and
resuming processing of the remotely connected test device when the first-in, first-out memory component maintains less than the threshold number of stored data segments.

24. A method as recited in claim 15, further comprising communicating the event data packets to a host computing device.

25. A method as recited in claim 15, wherein receiving the data segments includes receiving the data segments via an interconnect bus.

26. One or more computer-readable media comprising computer-executable instructions that, when executed, direct an event data acquisition device to perform the method of claim 15.

27. An event data acquisition device, comprising:
a data segment multiplexer configured to receive data segments from a test device remotely connected to the event data acquisition device, the data segments corresponding to test device events;
a memory component configured to receive the data segments from the data segment multiplexer and maintain the data segments in an order that they are received from the test device; and
a control component configured to pause processing in the test device with an interrupt output from the event data acquisition device when the memory component exceeds a threshold number of stored data segments.

28. An event data acquisition device as recited in claim 27, wherein the control component is further configured to resume processing of the test device when the memory component maintains less than the threshold number of stored data segments.

29. An event data acquisition device as recited in claim 27, wherein the control component is further configured to resume processing of the test device when the memory component maintains less than a minimum number of stored data segments.

30. An event data acquisition device as recited in claim 27, further comprising an event data packet component configured to generate event data packets, an individual event data packet including at least one data segment having header information for a particular test device event and at least one data segment having event information for the particular test device event.

31. An event data acquisition device as recited in claim 27, further comprising an event data packet component configured to generate event data packets, an individual event data packet including at least one data segment having information for a particular test device event.

32. An event data acquisition device as recited in claim 27, further comprising an event data packet component configured to generate event data packets, an individual event data packet including at least one data segment having information for a particular test device event, and the event data packet component further configured to communicate the event data packets to a host computing device.

33. An event data acquisition device as recited in claim 27, further comprising an event data packet component configured to:
generate event data packets, an individual event data packet including at least one data segment having header information for a particular test device event and at least one data segment having event information for the particular test device event;
determine event data errors in the event data packets; and
communicate the event data packets to a host computing device.

34. An event data acquisition device as recited in claim 27, wherein the data segment multiplexer receives the data segments from a processor in the test device via an interconnect bus.

35. An event data acquisition device as recited in claim 27, wherein the data segment multiplexer is further configured to timestamp the data segments when they are received from the test device.

36. An event data acquisition device as recited in claim 27, wherein the data segment multiplexer is further configured to:
receive a first data segment having header information from the test device, the first data segment written to a first memory address in the test device;
receive a second data segment having event information from the test device, the second data segment written to a second memory address in the test device;
label the first data segment with a memory address identifier corresponding to the first memory address; and
label the second data segment with a memory address identifier corresponding to the second memory address.

37. An event data acquisition device as recited in claim 27, wherein the data segment multiplexer is further configured to:
receive a first data segment having header information from the test device, the first data segment written to a first memory address in the test device;
receive a second data segment having event information from the test device, the second data segment written to a second memory address in the test device;
label the first data segment with a memory address identifier corresponding to the first memory address, and with a data segment source identifier that corresponds to a source of the first data segment; and
label the second data segment with a memory address identifier corresponding to the second memory address, and with the data segment source identifier that corresponds to the source of the second data segment.

38. An event data acquisition device as recited in claim 27, wherein the data segment multiplexer is further configured to:
receive a first data segment having header information from the test device, the first data segment written to a first memory address in the test device;
receive a second data segment having event information from the test device, the second data segment written to a second memory address in the test device;
timestamp the first and second data segments when they are received from the test device;
label the first data segment with a memory address identifier corresponding to the first memory address; and
label the second data segment with a memory address identifier corresponding to the second memory address.

39. An event data acquisition device, comprising:
a data segment multiplexer configured to receive data segments from a test device remotely connected to the event data acquisition device, the data segments corresponding to operating system test events;
a first-in, first-out memory component configured to receive the data segments from the data segment multiplexer and maintain the data segments in an order that they are received from the test device; and
an event data packet component configured to generate event data packets, an individual event data packet including data segments having information corresponding to a particular operating system test event.

40. An event data acquisition device as recited in claim 39, further comprising a control component configured to pause processing in the test device with an interrupt output from the event data acquisition device when the first-in, first-out memory component exceeds a threshold number of stored data segments.

41. An event data acquisition device as recited in claim 39, further comprising a control component configured to pause processing in the test device with an interrupt output from the event data acquisition device when the first-in, first-out memory component exceeds a threshold number of stored data segments, and resume processing of the test device when the first-in, first-out memory component maintains less than the threshold number of stored data segments.

42. An event data acquisition device as recited in claim 39, wherein the event data packet component is further configured to communicate the event data packets to a host computing device.

43. An event data acquisition device as recited in claim 39, wherein the event data packet component is further configured to determine event data errors in the event data packets.

44. An event data acquisition device as recited in claim 39, wherein the data segment multiplexer receives the data segments from a processor of the test device via an interconnect bus.

45. An event data acquisition device as recited in claim 39, wherein the data segment multiplexer is further configured to timestamp the data segments when they are received from the test device.

46. An event data acquisition device as recited in claim 39, wherein the data segment multiplexer is further configured to:
receive a first data segment having header information from the test device, the first data segment written to a first memory address in the test device;
receive a second data segment having event information from the test device, the second data segment written to a second memory address in the test device;
timestamp the first and second data segments when they are received from the test device;
label the first data segment with a memory address identifier corresponding to the first memory address; and
label the second data segment with a memory address identifier corresponding to the second memory address.

47. A system, comprising:
a test device configured to generate operating system test events;
an event data acquisition device remotely connected to the test device and configured to:
receive data segments from the test device, the data segments corresponding to the operating system test events;
maintain the data segments in a first-in, first-out memory component, the data segments maintained in an order that they are received from the test device;
generate event data packets, an individual event data packet including at least one data segment having header information for a particular operating system test event and at least one data segment having event information for the particular operating system test event; and
communicate the event data packets to a host computing device.

48. A system as recited in claim 47, wherein the event data acquisition device is further configured to pause processing in the test device with an interrupt output when the first-in, first-out memory component exceeds a threshold number of stored data segments.

49. A system as recited in claim 47, wherein the event data acquisition device is further configured to pause processing in the test device with an interrupt output when the first-in, first-out memory component exceeds a threshold number of stored data segments, and resume processing of the test device when the first-in, first-out memory component maintains less than the threshold number of stored data segments.

50. A system as recited in claim 47, wherein the event data acquisition device is further configured to timestamp the data segments when they are received from the test device.

51. A system as recited in claim 47, wherein the event data acquisition device is further configured to:
receive a first data segment having header information from the test device, the first data segment written to a first memory address in the test device;
receive a second data segment having event information from the test device, the second data segment written to a second memory address in the test device;
timestamp the first and second data segments when they are received from the test device;
label the first data segment with a memory address identifier corresponding to the first memory address; and
label the second data segment with a memory address identifier corresponding to the second memory address.

52. A system as recited in claim 47, wherein the test device and the event data acquisition device are coupled via an interconnect bus.

53. A system as recited in claim 47, wherein the event data acquisition device is a peripheral card that is coupled to the test device via an interconnect bus.

54. One or more computer-readable media comprising computer executable instructions that, when executed, direct an event data acquisition device to perform a method comprising:
time-stamping data segments received from a test device remotely connected to the event data acquisition device, the data segments corresponding to operating system test events;
labeling first data segments having header information with a memory address identifier of a first memory address that the first data segments are written to in the test device;
labeling second data segments having event information with a memory address identifier of a second memory address that the second data segments are written to in the test device;
writing the data segments to a first-in, first-out memory component in an order that they are received from the test device;
generating event data packets, an individual event data packet including at least one data segment having header information for a particular operating system test event and at least one data segment having event information for the particular operating system test event.

55. One or more computer-readable media as recited in claim 54, wherein the method further comprises pausing processing in the test device with an interrupt output from the event data acquisition device when the first-in, first-out memory component exceeds a threshold number of stored data segments.

56. One or more computer-readable media as recited in claim 54, wherein the method further comprises:
pausing processing in the test device with an interrupt output from the event data acquisition device when the first-in, first-out memory component exceeds a threshold number of stored data segments; and
resuming processing of the test device when the first-in, first-out memory component maintains less than the threshold number of stored data segments.

* * * * *